INVENTOR.
Robert D. Brackett
BY
Brown and Mikulka
ATTORNEYS

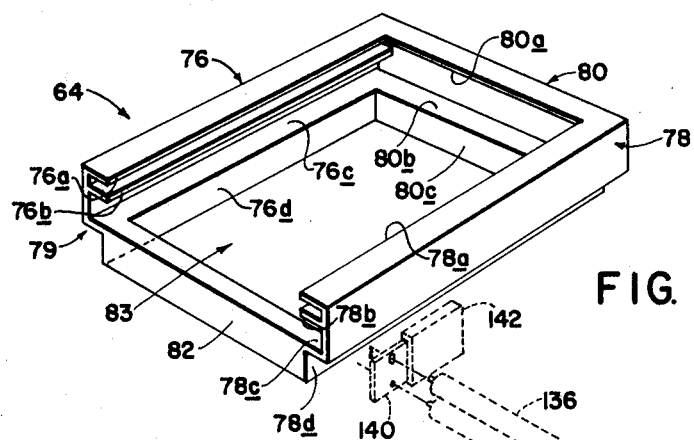
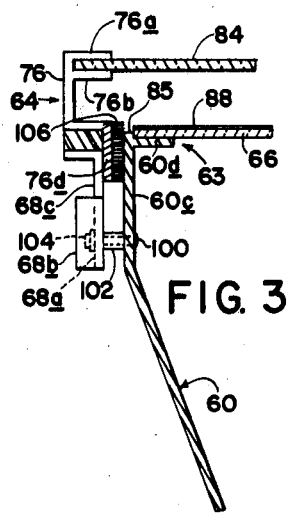
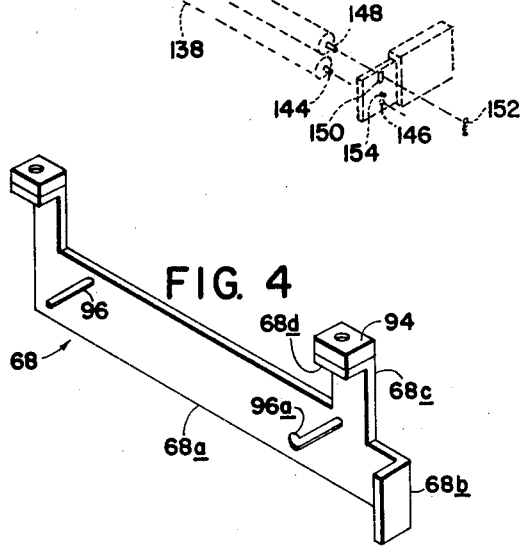
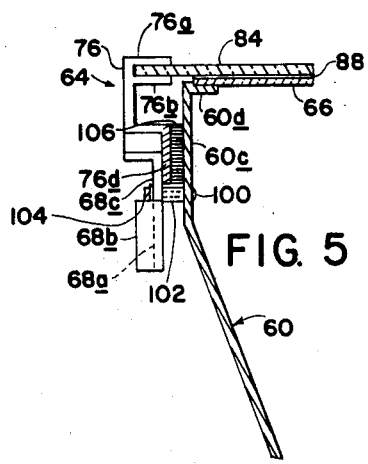

3,473,873
PHOTOGRAPHIC FRAMING AND
EXPOSURE APPARATUS
Robert D. Brackett, Wakefield, Mass., assignor to Polaroid Corporation, Cambridge, Mass., a corporation of Delaware
Filed May 1, 1967, Ser. No. 635,168
Int. Cl. G03b 27/52, 13/24, 13/26
U.S. Cl. 355—40                    10 Claims

ABSTRACT OF THE DISCLOSURE

A photographic accessary for use with a studio graphic-arts type of camera unit to provide both line and half-tone prints. The accessary consists of a lens-shutter-diaphragm assembly including a long focal length lens which is releasably mounted on an adapter which, in turn, is releasably mounted to the front of a camera unit bellows. A frame-like adapter having a central exposure aperture is attached to the upper surface of the bellows component so that its aperture is aligned with the central aperture of the bellows. A flared, vertically-positioned chamber has its aperture centrally aligned with the aperture of the adapter and is releasably attached to the upper surface of the adapter by its lower and smaller extremity. A horizontally positioned clear glass plate is supported by the upper and larger extremity of the chamber and a half-tone screen is positionable on the upper surface of the plate. A semi-compartmented holder is mounted at the upper flared portion of the chamber, the lower semi-compartment accepting a film-holding cassette. The latter has an apertured underface which is vertically positioned so that the emulsion is brought to the focal plane in contact with either the upper surface of the glass plate and the half-tone screen if it is then located there. The upper semi-compartment of the holder contains a ground-glass viewing and framing screen which is brought into contact with the upper surface of the glass plate and the half-tone screen when the cassette is removed and the holder is lowered.

---

In brief, the apparatus of the invention comprises a lens of special characteristics and mounting means therefor, a tapered chamber component of given dimensions and a suitable adapter therefor for extending the working distance from lens to focal plane, a glass supporting or pressure-plate, a half-tone screen, a film-holding magazine or cassette, a ground-glass viewing means, an adjustable semi-compartmented holder or receptacle cooperating with the tapered chamber for together releasably mounting the aforesaid viewing means, cassette, pressure plate and half-tone screen in assembled relation, as well as permitting their manipulation for optional subject framing and line or half-tone photographic usage, and means for adjusting the elevational position of the aforesaid holder or receptacle for framing and exposure purposes.

The apparatus of the invention more particularly relates to a camera unit of the above-mentioned type sold by Polaroid Corporation, Cambridge, Mass., which is capable of exposing and, immediately thereafter, processing film materials releasably-carrying a processing composition to provide photographic prints by a diffusion transfer method. This unit, which utilizes a baseboard for mounting subject matter to be photographed and includes illuminating means; which, conventionally, is adjustably mounted on a pedestal for distance settings, and which is termed the "MP-3 Polaroid Multi-Purpose Industrial View Camera," includes among its components an extensible bellows, a removable lens and shutter combination, an adapter or carriage slidably fastened to the camera back for accepting, alternatively, conventional mounting-and-processing means for either cut or roll film, and a ground-glass viewing or framing screen. The aforesaid mounting-and-processing means and the viewing screen are separable from the adapter. The accessory apparatus of the invention may then be mounted on the adapter in place of the conventional mounting-and-processing means for cut film which has been removed.

A film assembly of a type generally suitable for use with the camera unit and apparatus of the present invention includes photosensitive and image-providing components and a releasably-contained processing liquid, e.g., a processing liquid carried in a compressible frangible container component of the film assembly located adjacent to one end thereof. The film assembly is of a multi-layered structure such that after exposure, release of the liquid by the progressive application of a compressive force to the liquid container, spreading of the liquid between, and imbibition thereof into predetermined layers including an exposed silver halide emulsion layer, provide a visible image. The image is formed by the diffusion transfer of image-forming substances to a designated image-receiving surface. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight mordant to facilitate the transfer process. In producing a black-and-white image, a latent image is developed; the exposed silver halide is reduced to silver, and the unreduced silver halide forms a soluble silver complex which is transferred from undeveloped areas to the superimposed image-receiving surface, the image being formed on the latter in silver. A procedure of this description is disclosed, for example, in U.S. Patent No. 2,543,181 issued to Edwin H. Land.

A production duplicating system generally adapted to use photographic prints of the type produced by apparatus of the present invention as inking matsers is set forth in the copending U.S. patent application of Edwin H. Land et al., Ser. No. 626,089, filed Mar. 27, 1967, for "Novel Processes and Products." As described therein, a transferred image in silver effected by use of a special processing liquid, and areas underlying the image composed, for example, of a siliceous hydrophilic image-receiving surface are removed by treatment with an aqueous solution to uncover a hydrophobic layer underneath. This provides an intaglio rendition of the image in terms of the removed hydrophilic and remaining hydrophobic layers. The uncovered image areas of the hydrophobic layer are receptive to a printing ink, having an oleophilic or greasy vehicle or carrier, the laterally adjacent hydrophilic areas being non-receptive to the printing ink. The prints, upon taking up the printing ink as described, serve as printing masters, e.g., in a letterpress or offset printing procedure.

In accordance with the foregoing considerations, a principal object of the present invention is to provide framing and exposure apparatus for use with components of a camera unit of given characteristics and film material releasably-embodying a processing liquid, for rapidly producing photographic prints immediately following exposure of the film material, the prints being of a quality and size adapted to use as inking masters in a companion large-scale duplicating process.

Other objects are to provide apparatus of the character described for use with a camera unit which is of a vertical, semi-permanently-installed or studio type especially adapted to graphic arts usage; to provide apparatus of the aforesaid category for producing, optionally prints adapted to use in either line or half-tone reproduction; and to provide apparatus of the character stated which enables an effective flat mounting of a film material at a focal plane and a ready functional interchange of viewing and exposure means relative to the subject matter being photographed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a diagrammatic perspective view of a holder or receptacle for mounting a ground-glass viewing screen and a film cassette;

FIG. 3 is a fragmentary sectional view of the holder for the viewing screen and cassette and a tapered chamber for accommodating to a lens of long focal length, the chamber mounting a film-supporting glass plate, and a half-tone screen;

FIG. 4 is a diagrammatic perspective view of one of a pair of slide bars for raising and lowering the holder of FIG. 2 relative to the supporting plate and half-tone screen;

Figure 6:
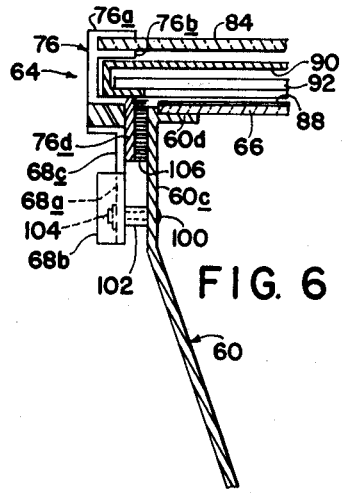
Figure 7:
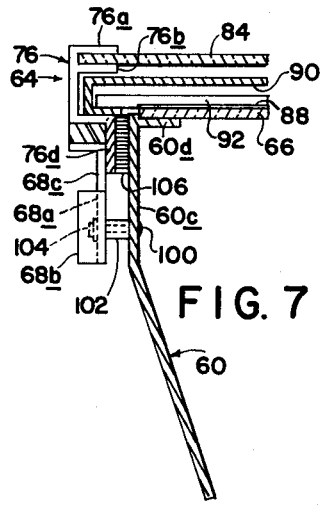
Figure 8:
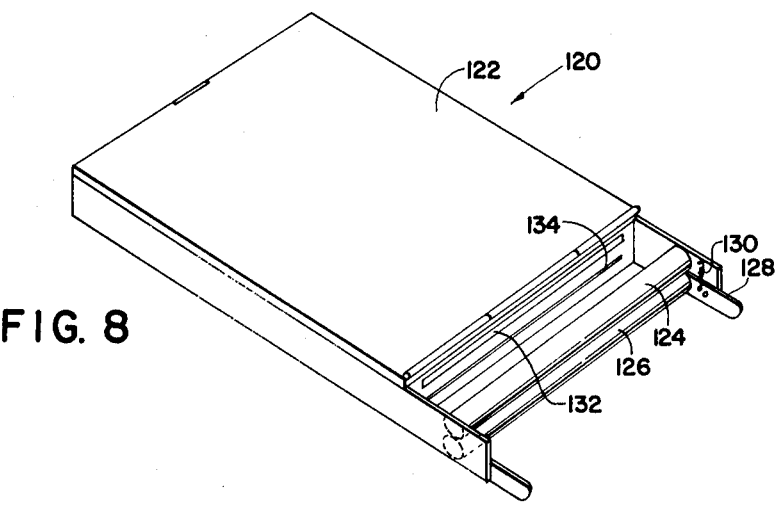
Figure 9:
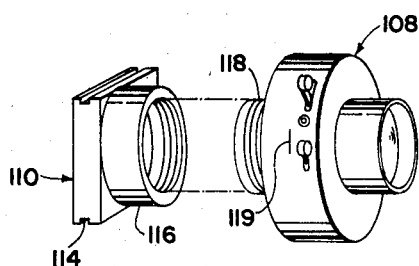

FIG. 5 includes the elements of FIG. 3 and illustrates the ground-glass viewing screen having been brought to the focal plane established by the film-supporting glass plate and the half-tone screen mounted thereon;

FIG. 6 illustrates the elements of FIG. 3 at a substantially similar position thereof, but with the film cassette loaded in the holder;

FIG. 7 includes the elements of FIG. 6 but illustrates the film emulsion in contact with the half-tone screen at the focal plane;

FIG. 8 is a diagrammatic perspective view of one type of film cassette including compressive film-processing means; and FIG. 9 is a diagrammatic perspective view of the lens assembly components of the subject invention.

Referring now to the drawings, a graphic-arts type of camera assembly or unit 10 is shown, the accessory apparatus 12 of the invention being incorporated therewith. The camera unit 10, that is, exclusive of the subject accessory apparatus, is the "MP-3" camera sold by Polaroid Corporation, above referenced, and described in detail in U.S. Patent 3,270,652. It includes principal components as follows. A horizontally positioned baseboard 14, upon which subject matter 16 to be photographed is positioned, supports a vertical pedestal 18 and a pair of upwardly-extending lamp brackets 20. The latter mount a plurality of so-called "flood-lamps" 22 directed toward the subject matter 16. A support bracket 24, to which the open back of a camera 26 is attached, is slidably mounted on the pedestal 18, the elevational location of the bracket being determined by counterbalancing means and by friction-drive mechanism, not shown. Its position is fixed by the knob 28 actuating a holding- or set-screw bearing against the pedestal. The camera includes an extensible bellows 30 and a frontal mounting-plate 32 for releasably attaching thereto a lens-shutter-diaphragm assembly 34, to be described below and constituting a component of the accessory apparatus. The extension of the bellows for fine focusing purposes is controlled by the knob 36, operating a rack-and-pinion or generally similar mechanism.

A carriage 38 is slidably mounted on the upper surface of the support bracket 24, namely, for slidable movement in suitable channel or track means, not shown, in directions toward and away from the pedestal 18. This is accomplished by grasping the handle 40, pressing the detent-release button 42 and, respectively, pushing or pulling the carriage. There are two significant positions of the carriage 38. One position, namely, that at which it is pulled forwardly, generally toward the viewer in FIGURE 1, to its extreme location, serves to locate a conventional roll-film holding and processing unit 44, of a type sold by Polaroid Corporation, in alignment with the open camera back. The second or inward position of the carriage is that shown and one which places an adapter 46 suitable for mounting either a conventional "Film Holder #500," sold by Polaroid Corporation, for exposing and processing a 4" x 5" cut film assembly or, alternatively, the accessory apparatus 12 of the invention which, as illustrated, is that mounted thereon. The adapter 46 is a rectangular frame-like element fixedly attached to the upper surface of the carriage 38 and including a central aperture 48 for transmitting the light rays of a photographic exposure, a recessed marginal supporting platform or rim 50 extending in a horizontal plane around the aperture at three sides, and a plurality of fastening means such as the slotted levers 52.

Either the aforesaid conventional film-holder or the accessory apparatus 12 of the invention is slidably insertable between the two vertical side-walls 54 which define the outer edges of platform 50 to a depth determined by the recessed location of the platform 50. The apparatus 12 is thus mounted on the platform 50 and held in fixed position by engagement of the slotted levers 52 with the laterally extending pins 58.

The accessory apparatus 12 will now be described in detail. The tapered chamber component 60 has an opening defined by the horizontal marginal portions 62 at its lower extremity which substantially matches the opening 48 formed in the adapter 46 so that when the two elements are fastened together, one continuous opening exists. It will be noted that the sides of chamber 60 rise vertically at lower portions 60a; flare outwardly at intermediate portions 60b, and again proceed vertically at upper portions 60c terminating in an opening at 63 adjacent to a focal plane. The lower portions are thus formed to provide a firm seating of the chamber within mating portions of the adapter 46; the intermediate upwardly flared portions to accommodate to diverging light rays of the photographic exposure, and the upper portions to provide an adjustable mounting of a partially or semi-compartmented holder or receptacle 64, releasable mounting of a glass supporting- or pressure-plate 66 (FIG. 3), and slidable mounting of a pair of actuator slide-bars 68. Each of a pair of bracing bars 70 is welded to a lower outside side portion of chamber 60 to provide a suitable mounting of the locking pins 58. The bars additionally permit the mounting thereon of a pair of projecting keying pins 72. The keying pins are adapted to enter a pair of mating perforations 74 formed in the upper surface of the adapter 46 to facilitate correct alignment of the respective apertures of the chamber 60 and adapter 46 and to provide insurance against their displacement.

The holder 64, further shown in FIGS. 2, 3 and 5–7 includes the two side members 76 and 78 terminating in an open front 79, the back member 80 and the front member 82 of reduced width, which members are joined together at their extremities to form a generally rectangular frame-like integral structure having a rectangular central aperture 83. The terms "front" and "back" or their equivalents, as used herein, relate to proximity to or remoteness from the plane of the open front 79 of the holder 64. The side and back members include, respectively, the inwardly extending flange portions 76a, 78a and 80a. The two side members also include the two inwardly extending flange portions 76b and 78b. A rectangular ground-glass viewing screen 84, including the marginal framing lines 85, is releasably positioned between the mounting means therefor comprised by the flanges 76a and 78a and the flanges 76b and 78b which form a partial compartment for the purpose. The side and back members additionally include the horizontal marginal portions 76c, 78c and 80b and the vertically depending portions 76d, 78d and 80c, the portions 76d and 78d being joined at their forward extremities by the front member 82.

The upper extremities 60c of the chamber 60 include the inwardly extending horizontal flange or marginal supporting portions 60d and the vertically raised bead 85 surrounding the aperture 63. A rectangular clear glass plate 86 of high optical quality is mounted on the supporting flanges 60d. A half-tone screen 88, e.g., a plastic sheet having a multiplicity of minute linearly disposed dots formed photographically throughout its area during manufacture is mounted on plate 86 when the subject matter 16 is of a continuous tonal nature as, for example, a photograph of a person or scene. The half-tone screen may be held against displacement by any suitable means, e.g., by a few touches of removable rubber cement at its margins. It will be understood that the half-tone screen may be one of any selected coarseness or fineness, as determined by the reproduction standard desired, for instance one of so-called "65 lines," "85 lines," "135 lines," etc. As will be understood in the graphic arts, each of the dots of the screen is opaque at its center and becomes gradually translucent proceeding outwardly therefrom in radial directions. The dots are formed on the upper surface of the half-tone screen. Where the subject matter is of a so-called "line" nature, that is, printed matter or the like, the half-tone screen is removed from the supporting glass plate 86. Where combination line and half-tone reproduction is involved, the half-tone component of the subject mater is first photographically converted to a screened version thereof; inserted in the proper area of the subject matter, and then the entire material is photographed as for a line reproduction, the entire procedure being one known to the art. The upper surface of the plate 66 or of the half-tone screen 88, if mounted thereon, constitutes the focal plane of the camera assuming the installation of the accessory apparatus of the invention. The thickness of the half-tone screen, e.g., one of .015", is insignificant in terms of the focal distances involved.

The combined structure of the holder 64, the upper portions 60c of the tapered chamber, and the slide bars 68 permit an up-and-down movement of the holder in response to manual actuation of the slide-bars. At an extreme upward position of the holder 64 (FIG. 3) a film-holding container or cassette 90 (FIGS. 6 and 7) can be inserted in the semi-compartment formed between the flange portions 76b and 78b and the horizontal marginal portions 76c and 78c so as to rest on the latter and the marginal portion 80b. At an extreme downward position of the holder 64, without the cassette mounted therein (FIG. 5), the ground-glass viewing element 84 is brought into contact with either the half-tone screen 88 if, as shown, it is installed, or with the upper surface of the glass plate 86 if no half-tone screen is used, the ground-glass element thus being positioned at the focal plane for viewing and framing the subject matter 16.

Figure 1:
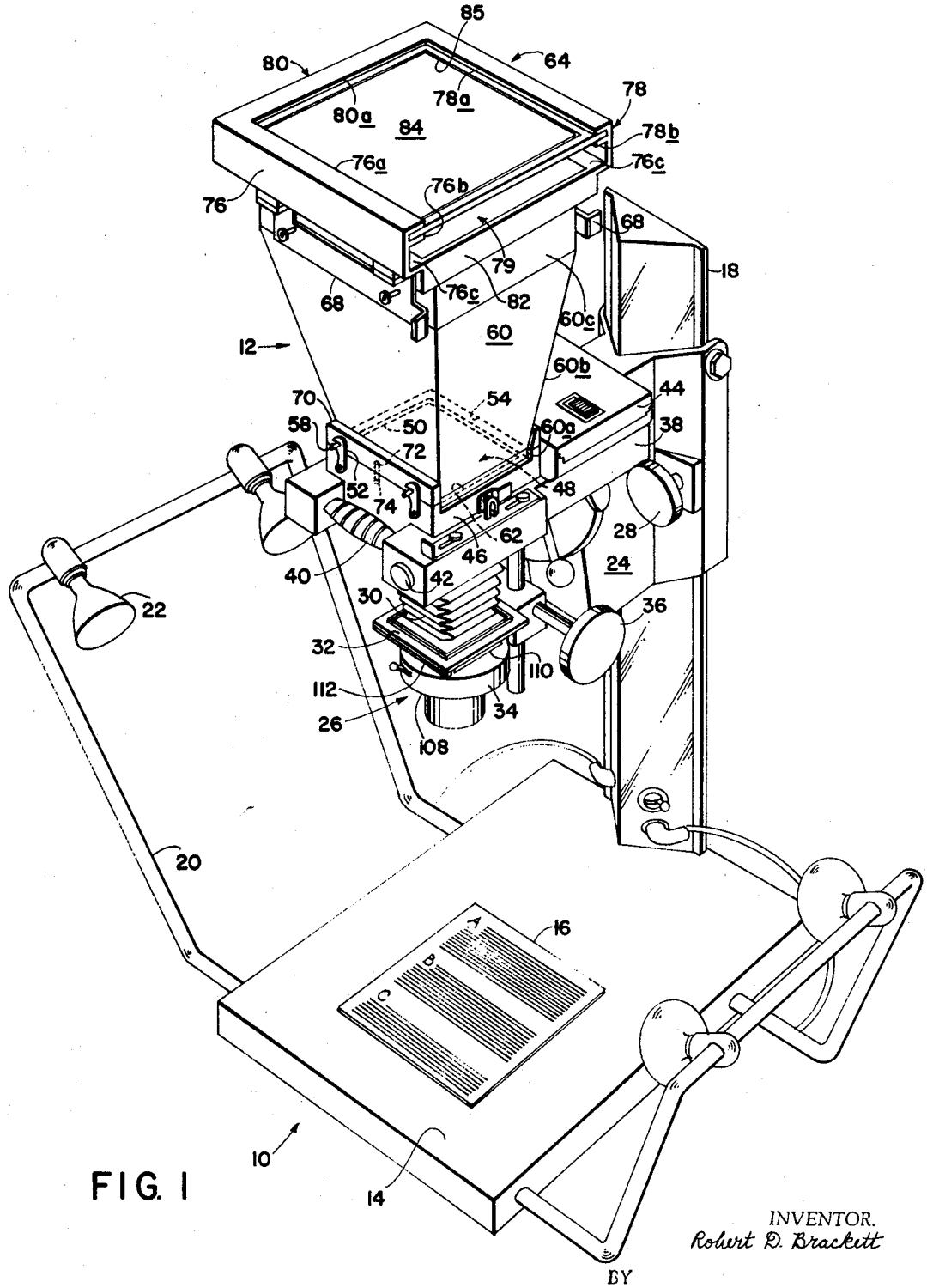
FIG. 1 is a diagrammatic perspective view of a camera unit incorporating the accessory and complementary apparatus of the present invention.

Vertical movement of the holder 64 to provide contact of either the ground-glass viewing screen 84 (FIG. 5) or the uncovered emulsion of a film unit 92 (FIG. 7) mounted in the cassette with the half-tone screen 88, assuming its use, is provided by manual actuation of the slide-bars 68, as previously intimated. Each of the slide-bars includes a principal elongated longitudinal section 68a having an integral actuating handle 86b at its forward extremity, and a pair of integral relatively-short vertical appendages 68c adjacent to its extremities. The vertical appendages or sections 68c have overturned extremities 68d upon which is fastened a pair of pad elements 94, composed, for example, of a plastic such as nylon. A pair of slots 96, disposed at an acute angle, e.g., at 45° relative to the longitudinal dimension of the slide bar, is formed therein adjacent to its extremities. The forward slot has a short generally upwardly inclined recess or extension 96a at its lower extremity. A pair of studs 100 is fixed to and protrudes outwardly from opposite left- and right-hand vertical portions 60c of the chamber 60. Spacer means 102 are fixed, e.g., threadedly, to the protruding studs 100 and retaining caps 104 are fastened to their extremities. The studs 100 pass through the slots 96 and are of a diameter such as to permit slidable movement of the slot surfaces thereacross. By manually pulling the handle 68b forwardly, that is, generally to the right in FIGURE 1, the slots 96 are caused to ride upwardly of the studs 100 until the forward stud enters the slot portions 96a at which location the slide-bar 68 is held at its maximum upward position. At this position the pads 94, bearing against the under surfaces of the holder marginal portions 76c and 78c, carry the holder 64 to its maximum upward location whereat it is retained, as shown in FIGS. 1, 3 and 6. To release each slide-bar 68 from the slot portions 96a for the purpose of lowering the holder 64, the handles 68b are raised slightly and the bars then pushed inwardly. During these procedures, the inner surfaces of the rear vertical sections 68c are inslidable contact with the outer surfaces of the holder depending-portions 76d. Strips 106 of a piled fabric are attached to the inner surfaces of the depending portions 76d and are in contact with the outer surfaces of chamber portions 60c. The strips serve both a spacing and light-sealing function. At the position of the holder 64 illustrated in FIG. 3, the ground-glass screen 84 and the clear glass plate 66 and half-tone screen 88 may readily be slidably removed for cleaning or any other purpose by drawing them forwardly.

As previously indicated, the distance to which the holder 64 is lowered for framing purposes, using the ground-glass screen, as represented in FIG. 5, is determined by contact of the under surface of the ground-glass element 84 with the half-tone screen 88. It is to be assumed that this position is reached slightly prior to the angularly upper limits of the slots 96 coming into contact with the studs 100. Assuming the slide bars 68 to have been pulled outwardly to provide the maximum elevation of the holder, as shown in FIG. 3, a cassette 90 containing a film unit 92, is inserted in the open end of the holder between portions 76b and 76c thereof as shown in FIG. 6. The holder is then lowered slightly, in the manner previously described and shown in FIG. 7, to bring the film emulsion into firm contact with the half-tone screen 88 or, optionally, with the planar glass plate 66. The latter serves to hold the film emulsion in a perfectly flattened condition at the focal plane, throughout its area. At this position the film is adapted to be photographically exposed. Prior to bringing the film emulsion into the aforementioned contact, a protective so-called "dark slide" may be removed from the open face of the cassette, assuming the film unit to require such a protective element.

An additional component of the apparatus of the present invention, complementary to those already described, is the lens-shutter-diaphragm assembly 108 and the mounting plate or adapter 110. The assembly 108 comprises a multi-element lens of 12-inch focal length and a between-the-lens iris-diaphragm-shutter combination providing a suitable range of shutter speeds and f/values, e.g., a range of shutter speeds between 1 second and $\frac{1}{100}$ second, bulb and time, and a range of diaphragm settings between f/6.3 and f/45. The 12-inch focal length of the lens assumes a distance setting of 24 inches from a nodal point of the lens to the upper surface of the subject matter 16, positioned on the base 14, as enabled by the vertical position of the bracket 24 on the pedestal 18. It also assumes a distance of 24 inches from the aforesaid nodal point of the lens to the focal plane at 88, as produced by the chamber 60 and holder 64 components, above described. These measurements provide a 1:1 subject-image ratio. It will thus be understood that little or no operation of the controls 28, 36, etc. relating to vertical positioning will be necessary excepting where the thickness of the subject matter being photographed varies, so as to affect the plane of its upper surface.

The rectangular adapter 110 is attached to the mounting plate 32 positioned frontally of the bellows 30, through the instrumentality of a pair of knife-edged engaging means 112 slidably mounted on the plate 32 and insertable in the slots 114 of the adapter. The adapter includes a circular internally threaded integral flange 116 for engaging the externally threaded lens-barrel component 118 of the assembly 108. A scribe mark 119 on the casing of the assembly indicates the location of a nodal point for distance measuring purposes.

A typical setting of the lens-shutter-diaphragm assembly 108 and certain other related values for effecting the photographing of a given piece of printed subject matter 16, e.g., a printed sheet of 8½" x 11" dimensions, may be considered as follows. Assuming a film speed of ASA 3000, the light incident upon the subject matter, as produced by the lamps 22, is of approximately 375 foot candles. It is to be assumed that the film emulsion dimensions are at least 8½" x 11" and preferably somewhat larger to permit a 1:1 ratio of image to subject. The distance from the nodal point of the lens to the subject 16 is set at 24 inches. The shutter speed is set at 1/25 second and the diaphragm opening at f/22. A small difference of exposure settings may be necessary between line and half-tone photography.

The film-holding means or cassette which is mounted within the holder 64 may be of any suitable type. One such cassette is described in U.S. Patent 3,103,864. A cassette 120 which may be mounted in the holder 64 and which includes integral processing means is shown in FIG. 8. It comprises a main body 122 which accepts a single film unit of a self-processing type, above-described, and positions it for photographic exposure. The body portion 122 may be considered as generally similar in structure to the cassette of the above-referenced patent. Mounted so as to be integral therewith is a pair of rotatable pressure rolls 124 and 126. The roll 126 is mounted between a pair of pivotal arms 128 and is biased toward the roll 124 by a pair of extension springs 130. A leader of the film unit is adapted to extend through the slot-like aperture 132 and between the pressure rolls. An opaque protective "cover slide," assuming its requirement, is adapted to extend through the slot 134 and to be removed prior to the exposure. After the exposure, the film-unit leader is pulled manually to draw the film unit between the pressure rolls and effect its processing, it being assumed that the film unit structure is of a type wherein the emulsion is adequately protected from actinic light during its passage between the rolls, e.g., by a removable envelope or the like.

Another structure contemplates incorporation of the processing means with the holder 64. Assuming the employment of a cassette of the general type set forth in U.S. Patent 3,103,864, the film unit must be removed from the cassette in a suitable protective environment relative to actinic light, and then subjected to processing means. The example of FIG. 8 has illustrated a processing structure integral with the cassette. The processing mechanism may, however, be incorporated with the holder 64, as indicated by the structure shown in FIG. 2 in broken line. It includes the rotatable pressure rolls 136 and 138, the mounting end-plates 140 and the slotted brackets 142 for frictionally but demountably holding the end-plates, therewithin. It is to be assumed that the brackets 142 are attached, e.g., welded to the outer surfaces of the side members 78 adjacent to the forward or open end 79 of the holder. The stub shafts 144 are mounted in the bearing-perforations 146. The stub shafts 148 are mounted in the bearing-slots 150. The pressure roll 136 is biased toward the pressure roll 138 by the extension spring 152 which is looped at one end around the stub shafts 148 and at the other end around the pins 154. It is again to be assumed that the film emulsion, after exposure, is adequately protected by some form of temporary opaque covering sheet prior to its emergence from the cassette and passage between the pressure rolls. The mounting means for the pressure rolls, here described, are, of course, merely illustrative to show compressive means which are removable from a location covering the open end 79 of the holder 64 to permit loading and withdrawal of a cassette relative thereto. It is to be understood that other and, indeed, more preferred mounting structures may be employed as, for example, a pivotal attachment of the pressure roll mounting means to the upper surfaces of the flanges 78a, whereby they may readily be pivoted to functional and non-functional positions.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with components of a vertically positioned graphic-arts camera unit, including a baseboard for mounting subject matter to be photographed and means for illuminating said subject matter, to provide, through the instrumentality of framing and exposure components and in conjunction with self-processing film materials of a given type, both line and half-tone prints of relatively large dimensions and a quality suitable for use as printing masters in a related duplicating process, said apparatus comprising a lens-shutter-diaphragm assembly including a lens of long focal length, means releasably-mounting said lens-shutter-diaphragm assembly to an adapter component which, in turn, is demountably attached to the front of a bellows component of said camera unit, a frame-like adapter having a central exposure aperture passing therethrough attached to the upper surface of said bellows component so that its aperture is aligned with the central aperture passing through the bellows, a flared vertically-positioned chamber component having an aperture extending therethrough releasably-attached at its lower and smaller extremity to an upper surface of said adapter so as to have its aperture thereat aligned with said aperture of the adapter, a horizontally-positioned clear glass plate of optical quality supported by the upper and larger extremity of said chamber component and establishing at its upper surface a focal plane relative to said lens assembly, a half-tone screen optically positionable on the upper surface of said horizontal glass plate, a semi-compartmented holder element mounted at upper flared portions of said chamber component, said holder element being adapted to accept in a lower semi-compartment thereof a horizontally-disposed film-holding cassette having an apertured underface and to undergo vertical positioning to bring the emulsion of a film unit mounted in said cassette to said focal plane in contact with either of said upper surface of said clear glass plate and said half-tone screen depending upon the optional presence or absence of the latter, a ground-glass viewing and framing screen mounted in an upper semi-compartment of said holder element so as to be positioned across the upper substantially-open face thereof and adapted, with said cassette removed, to be brought into contact with one of said upper surfaces of said clear glass plate and said half-tone screen when said holder element is lowered, and means for manually raising and lowering said holder element to respectively insert and remove said cassette and to alternatively place said film emulsion and said ground-glass screen in contact with either said glass-plate upper surface and the upper surface of said half-tone screen.

2. Photographic apparatus, as defined in claim 1, wherein said lens has a focal length of approximately 12 inches; a set distance from a nodal point of said lens to the upper surface of said subject matter is approximately 24 inches, and a set distance from said nodal point of said lens to said focal plane is approximately 24 inches.

3. Photographic apparatus, as defined in claim 2, wherein said film unit has dimensions of at least 8½ x 11 inches; wherein said film emulsion has an ASA speed of 3000; wherein said illuminating means produces light of substantially 375 foot candles at said surface of said subject matter, and wherein said lens-and-shutter assembly has a range of diaphragm settings between $f/6.3$ and $f/45$, and a range of shutter-speed settings between 1 second and $1/100$ second.

4. Photographic apparatus, as defined in claim 3, wherein said diaphragm is set at approximately $f/22$ and said shutter speed is set at approximately $1/25$ second.

5. Photographic apparatus, as defined in claim 1, wherein said upper surface of said adapter is recessed and said flared chamber component is positioned within the recessed portion and releasably-attached relative thereto by a plurality of vertically-disposed fixed positioning pins and mating perforations of said adapter and chamber component and by a plurality of pivotal locking means carried thereby.

6. Photographic apparatus, as defined in claim 1, wherein a pair of elongated bar-elements, each having a pair of vertically-disposed appendanges including portions adapted to bear against under surfaces of said holder element and each comprising a pair of acutely-angled slots formed in its sides, the slot surfaces being slidably mounted on a pair of studs projecting outwardly from upper vertical portions of said flared chamber component, serves to raise and lower said holder element, responsive to manual outward and inward actuation of said bar-elements to provide slidable angular movement of said slot surfaces along said studs.

7. Photographic apparatus, as defined in claim 6, wherein each of said elongated bar-elements includes a handle at its forward extremity for effecting its actuation, wherein the forward slot of each bar-element includes a short extension thereof at its lower extremity disposed angularly relative to the principal direction of the slot, each said extension being adapted to accept a stud when located at said extremity and to hold said slide-bar and said holder element engaged thereby at a maximum elevated position, mutual release of each said stud and slot extension being effected by slightly lifting said handle.

8. Photographic apparatus, as defined in claim 1, wherein said holder element is substantially open at one end to permit slidable insertion and removal of said cassette and said ground-glass viewing and framing screen.

9. Photographic apparatus, as defined in claim 1, wherein is included therewith said film-holding cassette which is of a type incorporating compressive means for processing a film unit carried thereby following its exposure and advancement through an aperture of said cassette and between said compressive means.

10. Photographic apparatus, as defined in claim 8, wherein said holder element is of a type incorporating compressive means for processing a film unit carried by said cassette, said compressive means being displaceably-mounted at said open end of said holder element.

References Cited

UNITED STATES PATENTS

| 1,846,972 | 2/1932 | Koppe | 355—40 X |
| 2,564,934 | 8/1951 | Sussin | 355—40 X |
| 3,330,193 | 7/1967 | Kaess | 355—71 X |

NORTON ANSHER, Primary Examiner

RICHARD A. WINTERCORN, Assistant Examiner

U.S. Cl. X.R.

355—44, 71